United States Patent [19]

Jones

[11] 4,236,324
[45] Dec. 2, 1980

[54] AIRCRAFT GLIDE PATH TEACHING AID

[76] Inventor: Roy Jones, 661 W. Park Ave., Chandler, Ariz. 85224

[21] Appl. No.: 922,985

[22] Filed: Jul. 10, 1978

[51] Int. Cl.³ .............................................. G09B 9/08
[52] U.S. Cl. ..................................... 434/35; 33/264; 275R
[58] Field of Search ................. 35/12 B, 12 G, 12 N; 33/227, 229, 237, 263, 264, 276, 277, 286, 275; 73/178 R, 178 T

[56] References Cited

U.S. PATENT DOCUMENTS

| | | | |
|---|---|---|---|
| 2,397,712 | 4/1946 | Vought et al. | 33/229 |
| 2,412,585 | 12/1946 | Klemperer et al. | 33/229 |
| 2,459,919 | 1/1949 | Clark | 33/229 X |
| 2,517,779 | 8/1950 | Flint | 33/227 |
| 2,669,782 | 2/1954 | Turner | 33/276 X |
| 2,958,847 | 11/1960 | Trufanoff | 33/227 X |
| 2,971,260 | 2/1961 | West | 33/227 |
| 2,991,743 | 7/1961 | Ogle | 33/227 X |
| 3,073,156 | 1/1963 | Rowe | 33/228 |
| 3,128,623 | 4/1964 | Gold | 33/227 |
| 3,190,585 | 6/1965 | Busch et al. | 33/227 X |
| 3,471,931 | 10/1969 | Bezu | 33/264 |
| 3,810,312 | 5/1974 | Carson | 33/227 |
| 3,978,590 | 9/1976 | Wedding et al. | 33/263 |
| 4,034,480 | 7/1977 | Mehrtens | 35/12 B X |

Primary Examiner—Vance Y. Hum
Attorney, Agent, or Firm—Cahill, Sutton & Thomas

[57] ABSTRACT

A gimballed sight tube is mechanically positioned in alignment with a pilot's forward line of sight and it is set at a predetermined glide path angle. During a landing approach, the runway will be visible within the sight tube on or in proximity to the center of two cross hairs. Any deviation of the runway from the center of the cross hairs indicates vertical deviation of the aircraft from the predetermined glide path and appropriate corrective action may be taken by the pilot.

3 Claims, 8 Drawing Figures

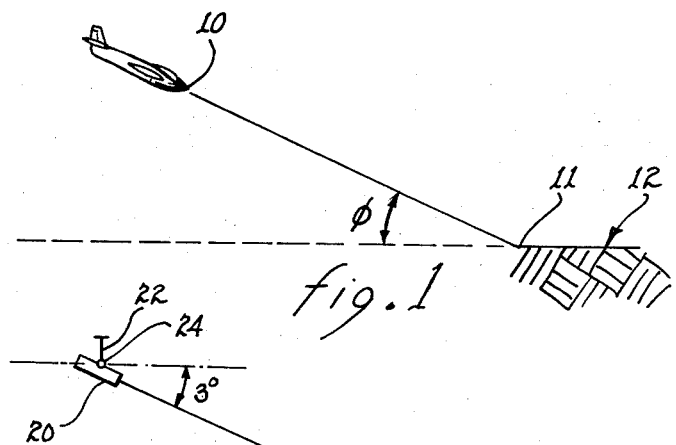
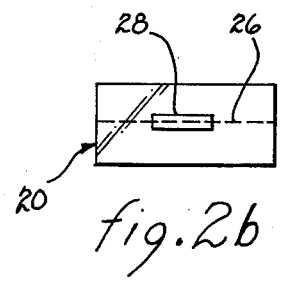
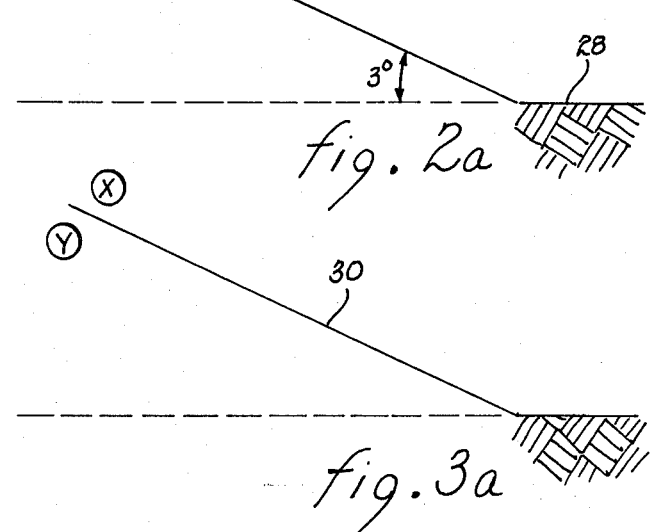
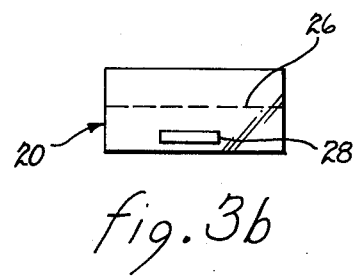
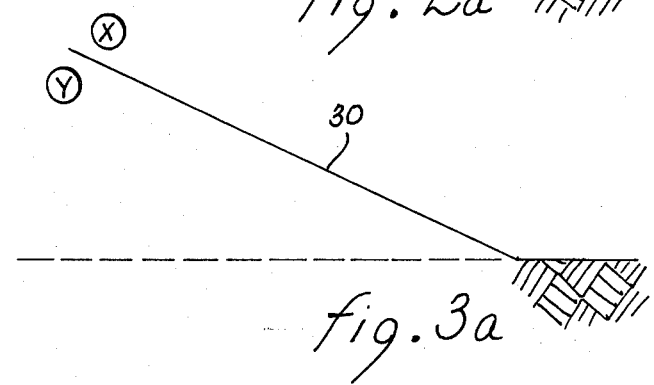
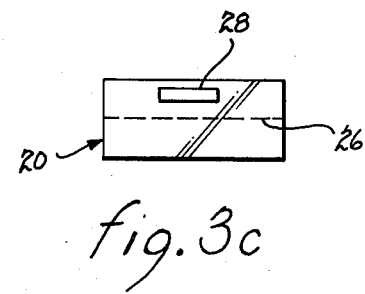
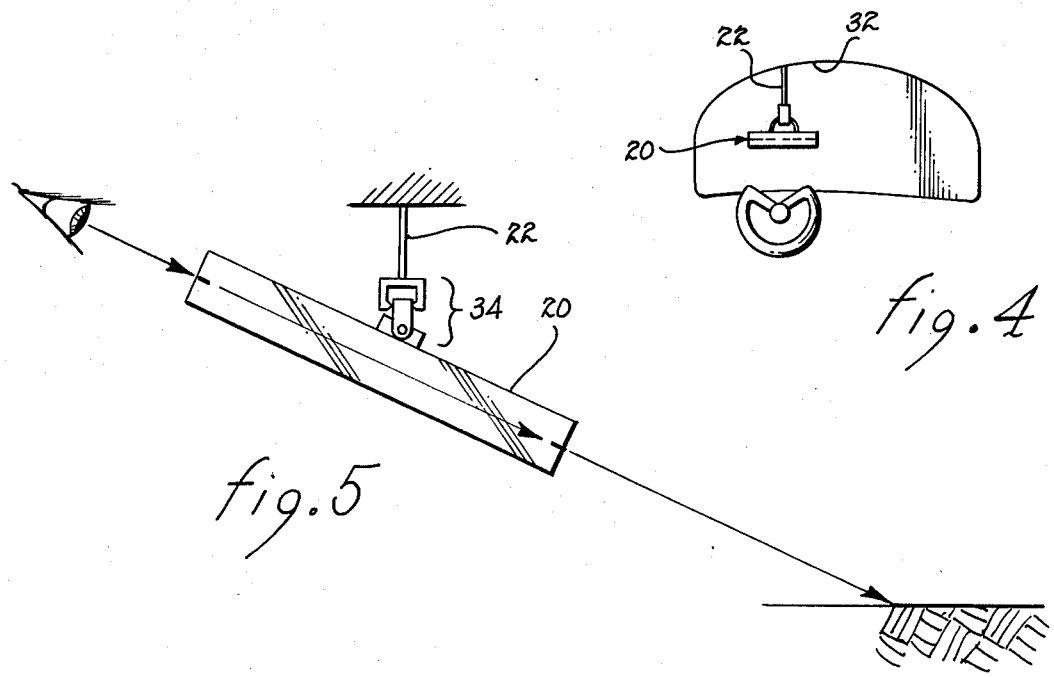

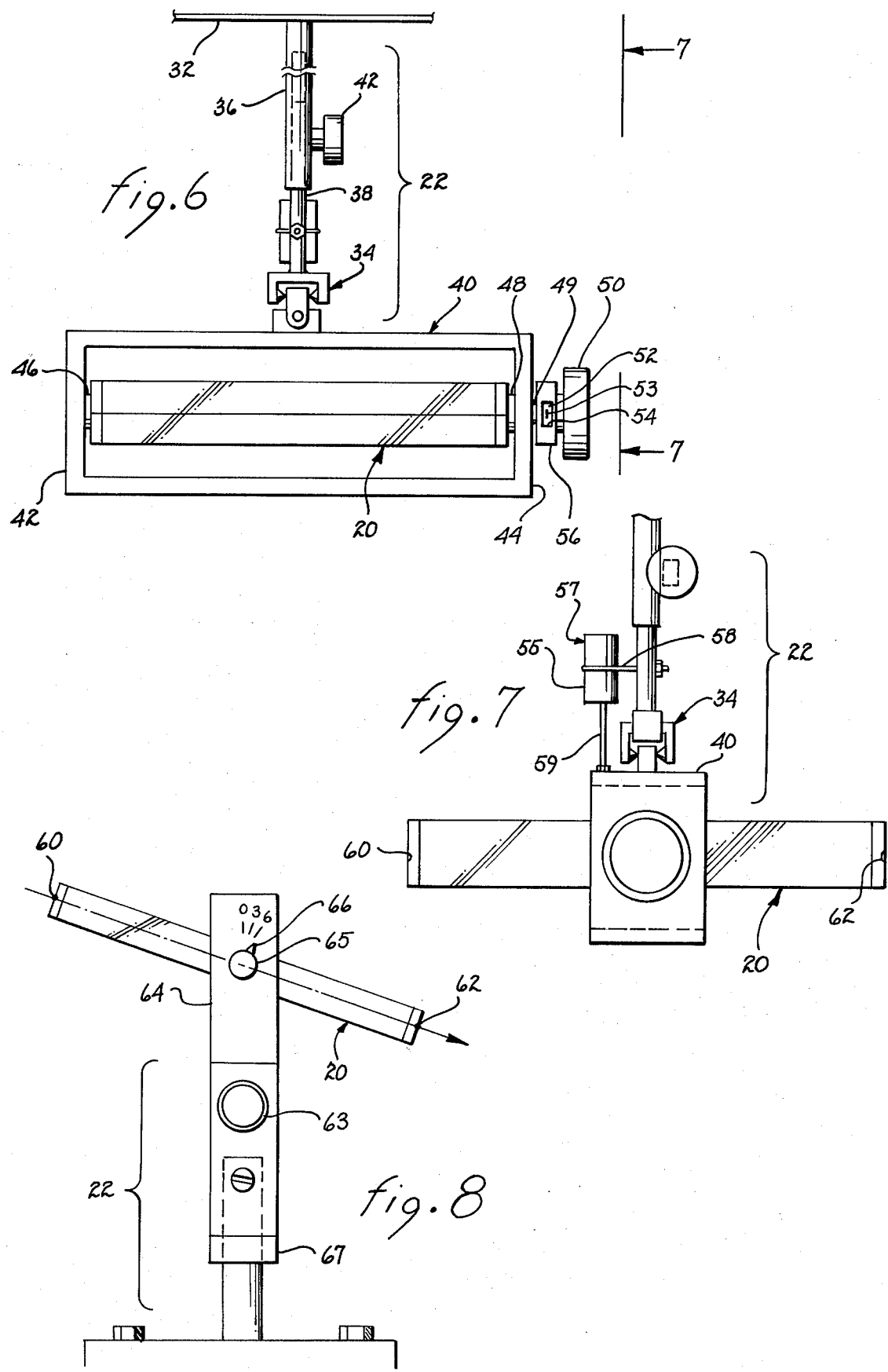

AIRCRAFT GLIDE PATH TEACHING AID

The present invention relates to teaching aids and, more particularly, to aids for teaching pilots to visualize and fly a predetermined glide angle on an approach to a landing field.

Generally, student pilots with proper methodical instruction relatively easily learn how to achieve and maintain control of an aircraft during conventional flight maneuvers. Where, however, flight maneuvers must be conducted with respect to a fixed point on the ground, such as during a landing, many difficulties often arise because of the student pilot's inability to comprehend and digest relative closure rates in both the horizontal and vertical planes with respect to a fixed point on the ground. For this reason, many instructors, after teaching a student pilot the over-the-ground track of a conventional landing pattern, also instruct the student to be at a particular height above ground at the point of entry into the pattern, the preferred height on turning onto the base leg and the preferred height on turning onto the final leg. Unfortunately, many student pilots assume that these points of reference are criteria from which deviation is to be avoided at all costs and the students fail to understand that the purpose for teaching these points of reference is primarily that of affording the student an opportunity to develop a sense of judgment between speed, height and distance to go. The end result of such over emphasis upon somewhat arbitrarily established reference points tends to cause disorientation and too high or too low approaches when students attempt to land at strange landing fields.

Most multi-engine and a few expensive single engine aircraft have full instrumentation which permits flight and landing approaches to touchdown with reference being made only to instruments. Such systems are extremely expensive and totally impractical in the type of single engine aircraft usually used by persons seeking to obtain their pilot's license.

Various patents have been issued which are directed to apparatus for indicating the pitch attitude or vertical flight path of an aircraft. One example is a U.S. Pat. issued to White, No. 3,648,232; it discloses a complex system for providing a head-up display of the aircraft pitch angle with respect to the horizon. The U.S. Pat. issued to Birmingham, No. 3,280,625, discloses a complex system for providing a head-up display which indicates an aircraft deviation from a predetermined glide path to a moving aircraft carrier.

The U.S. Pat. issued to Bateman, No. 3,654,806, is directed to a head-up display which superimposes a projected flight line upon a landing field; various sophisticated sensors and computational systems are necessary to provide the requisite visible display.

The U.S. Pat. issued to Bush et al., No. 3,190,585, is directed to a sighting device for a pilot having a forward and a rear sight cooperating with an aircraft pitch angle indicator. In order to utilize this device, the pilot must first set the pitch angle indicator and then maintain the forward and rear sights in alignment with the projected landing spot. If the pitch angle of the aircraft is altered due to changes in power and/or flap settings, adjustments must be made to the instruments because the aircraft glide angle will have been significantly modified. Such changes constitute a significant work load increase for a student pilot and may have the effect of overburdening his capability.

Various other patents generally representative of the prior art include U.S. Pat. Nos. 3,537,307, 2,426,184, 3,490,281, 3,574,283, 2,189,516, 1,958,456, 2,181,444, 1,745,933 and 3,005,185.

It is therefore a primary object of the present invention to provide a teaching aid for pilots to visualize their glide path approach on landing.

Another object of the present invention is to provide a teaching aid for pilots in maintaining a constant and selectable glide path angle during landing.

Still another object of the present invention is to provide a teaching aid for glide path control which is stable and independent of changes in the aircraft pitch axis.

Yet another object of the present invention is to provide an optical/mechanical device for visual reference to a predetermined glide path angle.

A further object of the present invention is to provide a glide path control instrument operable independent of ground based equipment.

A still further object of the present invention is to provide an inexpensive glide path control instrument useable in low cost powered aircraft.

A yet further object of the present invention is to provide an inexpensive instrument for visually determining clearance over an obstacle.

These and other objects of the present invention will become apparent to those skilled in the art as the description thereof proceeds.

The present invention may be described with greater specificity and clarity with reference to the following drawings in which:

FIG. 1 illustrates a conventional aircraft approaching a runway;

FIG. 2a is a schematic illustrating the operation of the present invention and FIG. 2b illustrates the pictorial representation presented to the pilot;

FIG. 3a is a schematic illustrating the deviation of an aircraft off a predetermined glide path and FIGS. 3b and 3c illustrate the pictorial presentation for such deviation as seen by the pilot;

FIG. 4 illustrates the mounting of the present invention with respect to a pilot's line of sight;

FIG. 5 is illustrative of the present invention in use;

FIG. 6 illustrates the apparatus of the present invention;

FIG. 7 is a side view taken along lines 7—7, as shown in FIG. 6; and

FIG. 8 illustrates a variant from the present invention.

A conventional aircraft letdown to a runway under instrument flight rules (IFR) is along a glide path angle of three degrees. Such a letdown is illustrated in FIG. 1 wherein an aircraft 10 is approaching end 11 of runway 12. The glide path angle is represented by the symbol theta ($\theta$).

For long approaches from a high altitude, a pilot must generally have a great deal of experience to maintain the correct glide path angle throughout the letdown. The appropriate and well known instruments in combination with the attendant ground based equipment, provide a visual indication of under or over shooting. These instruments are relatively expensive and are generally only found in multi-engine aircraft or expensive single engine aircraft. For neophyte pilots or pilots who do not fly a sufficient number of hours on a regular basis to maintain a high level of proficiency, substantial excursions from a predetermined glide path generally result. Such excursions result in less than optimal deployment of power and in the worst case may result in landing short of the runway or completing the landing roll off the far end of the runway.

Where, however, sophisticated equipment is carried in the aircraft, such excursions are readily and immediately visually apparent and can be minimized to an acceptable tolerance level. For aircraft which do not carry such expensive instruments, only continual practice to achieve and maintain pilot proficiency has heretofore been available as a solution.

The gist and operation of the present invention will be described with reference to FIGS. 2a, 2b, 3a, 3b and 3c. A sight tube 20 is suspended within the cockpit of an aircraft by suspension member 22. The suspension member supports the sight tube through an adjustment mechanism 24, which mechanism permits angular adjustment of the sight tube in the vertical plane with respect to a horizontal plane. Generally, the horizontal plane corresponds to the horizontal axis of the aircraft in level unaccelerated flight at optimum cruise speed. However, it is to be understood that the longitudinal axis of the aircraft may not be coincident with a horizontal plane at all speeds. Suspension member 22 also includes a gimbal which permits sight tube 20 to be repositionable with respect to the aircraft in response to the force of actual or apparent gravity acting upon the sight tube.

Assuming for the moment that a glide path angle of three degrees (as depicted) is to be flown, suspension member 22 is adjusted to set sight tube 20 at an angle of three degrees with respect to horizontal. In this position of the sight tube, the pilot, when looking through the sight tube, will see cross hairs 26 (see FIG. 2b) of sight tube 20 coincident with the pilot's foreshortened view of runway 28. If the pilot flies so as to maintain cross hairs 26 coincident with the runway, he will remain upon predetermined glide path 30 and touch down upon the runway.

Should the aircraft be located at point X, as shown in FIG. 3a, that is, above flight path 30, sight tube 20 will provide the pictorial illustration shown in FIG. 3b. Herein, cross hairs 26 are substantially above runway 28. The pictorial illustration therefor provides an indication to the pilot that he will overshoot the runway unless he increases his descent rate. Similarly, if the aircraft is below glide path 30 at position Y, as illustrated in FIG. 3a, the sight tube will provide the pictorial illustration shown in FIG. 3c. Herein, cross hairs 26 will appear below runway 28 and if the present flight path is maintained, the pilot will undershoot the runway unless he reduces his rate of descent.

It thereby becomes apparent that the pilot can readily maintain the predetermined glide path angle simply by adjusting the pitch of the aircraft and any necessary attendant power setting to maintain the cross hairs of the sight tube coincident with the runway.

Should the pilot deviate to the left or the right, the runway will not be centered within the sight tube and an appropriate change in direction of the aircraft will be necessary in order to maintain the runway centered within the sight tube.

FIG. 4 illustrates a typical mounting of sight tube 20. This is, suspension member 22 may be attached to roof 32 of cockpit 33 to suspend the sight tube therefrom. Thus, obstruction of the pilot's line of sight directly over the cowling of the aircraft (assuming a single engine aircraft) is avoided and impairment of visual contact with objects during landing is minimized or absent. The cross-sectional configuration of the sight tube and attendant structure in the pilot's line of sight is purposely configured to minimize impairment of the pilot's field of view during normal flight operations.

As illustrated in FIG. 5, suspension member 22 includes a gimball 34 which will support the sight tube in the manner of a pendulum. By use of this gimball, changes in pitch attitude of the aircraft will not affect angular displacement of the sight tube with respect to horizontal. Thus the speed at which the aircraft is flying, depending upon both the power setting and pitch attitude, may vary substantially without affecting the alignment accuracy of the sight tube.

The structure and mounting apparatus of the present invention will be described with joint reference to FIGS. 6 and 7. Suspension member 22 is attached to and suspended from roof 32 within the cockpit in general alignment with the pilot's direct forward line of sight. The suspension member may include a telescoping unit having an outer sleeve 36 and an inner rod 38. By adjustment of the vertical position of rod 38 with respect to sleeve 36, frame 40, supporting sight tube 20, may be vertically adjusted. To effect vertical adjustment of rod 38, a rotatable knob 42, mechanically connected to a pinion gear meshing with teeth disposed upon the rod may be employed. That is, knob 32 may operate a rack and pinion mechanism to raise and lower frame 40 or other means accomplishing such a result may be similarly incorporated. As stated above, gimball 34, which may take any one of several forms, maintains frame 40 in depending relationship from suspension member 22 responsive to the apparent gravitational force acting upon sight tube 20. Thereby, during unaccelerated flight and in the absence of changes in the roll or yaw axis of the aircraft, the vertical axis of from 40 will be in alignment with the actual or apparent force of gravity despite changes in the pitch axis of the aircraft.

Sight tube 20 is rotatably mounted in end pieces 42 and 44 of frame 40 by means of shafts 46 and 48 journalled within bushings or similar low friction elements in the end pieces. A knob 50 is mechanically connected to shaft 48 such that rotation of the knob produces a commensurate rotation of sight tube 20 about the axes of shafts 46 and 48. An indicator 52 is mechanically attached to shaft extension 49 extending from shaft 48 and includes indicia 53. The indicia is representative of the angular deviation of sight tube 20 from the horizontal axis of frame 40. A window 54 is disposed in shroud 56 enclosing indicator 52. The dimensions of the window are such that only indicia 53 representative of the angular deviation off horizontal of the sight tube is visible through the window. Thereby, the glide path angle to which the sight tube is to be set is achieved by simply turning knob 50 until the appropriate angle designation is visible through window 54.

Sight tube 20 includes two parallel cross hairs 60 and 62 (collectively previously referred to as cross hairs 26) disposed at opposite ends of the sight tube. These cross hairs generally bisect the sight tube into an upper half and a lower half. It is therefore apparent that upon visual alignment of these two cross hairs, the line of sight thereby defined is coincident with the deviation from horizontal commensurate with the angular indication visible through window 54.

To prevent or reduce excursions of frame 40 and the supported sight tube due to turbulence or rapid control movements by the pilot, a dashpot 57 (or damper) may be employed. In example, the cylinder 55 of the dashpot may be mechanically rigidly attached to rod 38 through brace 58 and the movable piston within the dashpot may be attached through rod 59 to frame 40.

FIG. 8 illustrates a variant of the present invention wherein the suspension member extends upwardly from a supporting surface, such as the upper shroud extending forwardly from the instrument panel of the aircraft. Vertical adjustment of sight tube 20 may be achieved through rotation of knob 63 driving a rack and pinion mechanism as described above or through similar means for raising and lowering the sight tube. Moreover, orientation of the sight tube with respect to mounting 64 may be achieved by a pointer knob 65 mechanically connected to the sight tube. Point 66 of the knob is positionable in registration with various preselected lines of demarcation representative of different glide path angles. It is to be understood that the suspension system of the variant may include pivot means or gimball means to automatically compensate for pitch attitude changes of the aircraft. Were such pivot or gimball means employed, it is expected that a counterweight 67 may have to be employed to achieve a stabilizing pendulum effort.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A teaching aid for teaching student pilots to maintain an aircraft on a predetermined glide path during letdown for a landing, said teaching aid comprising:

a. a sight tube for viewing the point of landing along a glide path angle, said sight tube comprising a tube having a rectangular cross-section and cross hairs for defining the predetermined glide path angle to indicate any vertical deviation of the aircraft off the predetermined glide path and wherein a cross hair of said cross hairs is disposed at each end of said sight tube;

b. a suspension member for supporting said sight tube in the forward line of vision of the student pilot, said suspension means including:
      i. opposed end pieces;
      ii. shaft means for supporting said sight tube from said end pieces;
      iii. knob means for pivotally repositioning said sight tube about a horizontal axis of the aircraft and with respect to said suspension member; and
      iv. means for indicating the degree of pivotal repositioning of said sight tube with respect to horizontal, said indicating means including indicia and a shroud having a window for uncovering one of said indicia in response to rotation of said knob;

c. angle adjustment means for setting said sight tube at an angle with respect to horizontal, which angle is commensurate with a predetermined glide path angle; and d. means for adjusting the height of said sight tube commensurate with the eye level of the student pilot;

whereby, deviation of the aircraft off the glide path is immediately visually apparent to the student pilot.

2. The teaching aid as set forth in claim 1 including means for stabilizing said sight tube during pitch changes of the aircraft.

3. The teaching aid as set forth in claim 2 wherein said stabilizing means comprises a gimball.

* * * * *